US008791646B2

(12) United States Patent
Welten

(10) Patent No.: US 8,791,646 B2
(45) Date of Patent: Jul. 29, 2014

(54) METHOD AND APPARATUS FOR REPEATING ILLUMINATION INFORMATION ON A DAISY CHAIN BUS STRUCTURE

(75) Inventor: Petrus Johannes Maria Welten, Oss (NL)

(73) Assignee: Eldolab Holding B V, Eindhoven (NL)

( * ) Notice: Subject to any disclaimer, the term of this patent is extended or adjusted under 35 U.S.C. 154(b) by 488 days.

(21) Appl. No.: 12/922,298

(22) PCT Filed: Mar. 12, 2009

(86) PCT No.: PCT/NL2009/000059
§ 371 (c)(1),
(2), (4) Date: Jan. 5, 2011

(87) PCT Pub. No.: WO2009/113847
PCT Pub. Date: Sep. 17, 2009

(65) Prior Publication Data
US 2011/0103401 A1   May 5, 2011

Related U.S. Application Data

(60) Provisional application No. 61/036,217, filed on Mar. 13, 2008.

(51) Int. Cl.
*H05B 37/02* (2006.01)
(52) U.S. Cl.
USPC ............ 315/291; 315/312; 370/400; 370/432

(58) Field of Classification Search
None
See application file for complete search history.

(56) References Cited

U.S. PATENT DOCUMENTS

| 5,910,814 | A | 6/1999 | Portman et al. |
| 6,799,235 | B2 | 9/2004 | Bormann et al. |
| 7,598,681 | B2 | 10/2009 | Lys et al. |
| 8,278,845 | B1 * | 10/2012 | Woytowitz ................... 315/307 |

FOREIGN PATENT DOCUMENTS

| CN | 1181862 A | 5/1998 |
| CN | 1692343 A | 11/2005 |
| EP | 1195740 A2 | 4/2002 |

OTHER PUBLICATIONS

Chinese Office Action from corresponding application, mailed Nov. 22, 2012.

* cited by examiner

*Primary Examiner* — Donald Mills
(74) *Attorney, Agent, or Firm* — Browdy and Neimark, PLLC

(57) ABSTRACT

A data communication method is described for transmitting a data packet comprising data bytes in a daisy chained bus structure of a LED illumination system. The method comprises: the nodes of a group, except the last node of the group retransmitting the data packet without removing a first data byte from the incoming data packet; and the last node in the group removing the first byte from the data packet before retransmission. The invention further comprises a communication node, illumination assembly and bus structure implementing the method according to the invention.

16 Claims, 3 Drawing Sheets

METHOD AND APPARATUS FOR REPEATING ILLUMINATION INFORMATION ON A DAISY CHAIN BUS STRUCTURE

FIELD OF THE INVENTION

The present invention relates to a bus structure, a communication node, an illumination fixture having such communication node, and a data communication method.

PRIOR ART

To transmit data to elements in an illumination system, such as a LED type illumination system, a daisy chaining bus structure has been applied to interconnect elements (also referred to as nodes) of the illumination system.

An implementation using true daisy-chaining (where each node receives its data from the upstream node via it's input bus port and places it into local memory subsequently retransmitting (part of) this data from memory via it's output bus port) exists in which a master sends a DMX-like packet to a first node in the chain and in which each node in the chain receives an incoming packet, uses the first data byte for its own purpose and than removes the first data byte from the packet, subsequently sending this packet via its output bus port. This node behaviour will be referred to as behaviour A in the sequel.

In this way, submitting each node with it's own setpoint or parameter is achieved. The problem with this solution is, that in applications where (a subset of) the nodes shall behave identically, all bytes in the DMX-like packet will carry the same value, but will nevertheless occupy a range of channels in the masters channel universe, where only 1 channel would have been sufficient, thus forcing more complex and more expensive masters to be used in larger applications.

Hence, large strings of identical data are required.

This problem particularly comes forward when interconnecting a plurality of nodes so as to form an illumination assembly. Such illumination assembly may from a users or programmers point of view be considered a single element, which makes the requirement to individually address all nodes of such assembly to be unnecessarily complex.

SUMMARY OF TO THE INVENTION

It is the purpose of the invention to enable implementations for applications where a group of 1 or more nodes shall have identical behaviour to use only 1 byte per such group, instead of as many bytes as there are nodes as in the problem case. Because of the single byte needed, less resources from a master will be used enabling a simpler and cheaper master to be used in many application cases.

To achieve these benefits, the nodes belonging to the group, except the last node in the group, will be given a different behaviour, e.g. referred to as behaviour B (in contrast to a previous behaviour A), in which the node does not remove the first byte from the incoming packet before retransmitting it. Thus all nodes in the group will receive the same first byte and will therefore show the identical behaviour (as far as based on this first byte). The last node in the group will be given behaviour A and will therefore remove the first byte from the packet before retransmission. A node or group of nodes next in the chain to this last node of the group, will use the second byte from the master's packet as their first byte and will therefore show different behaviour (in case this second byte is different from the first byte in the master's packet).

In an embodiment of the invention, a behaviour B may be the fixed behaviour of all nodes but the last one. The last node may have fixed behaviour A.

In a further embodiment the nodes may be commanded to switch between behaviour A and B, depending on the application. This can be done for example as follows. DMX-like packets use a start code byte at the beginning of the packet to indicate that all data bytes are operational data bytes, usually for a known effect on the behaviour of the nodes. By changing that start code byte to a different value (be it a proprietary or a shared public value), the nodes can be instructed to interpret the data bytes in the packet differently, for example as parameter or configuration data.

Using a specific value for the start code byte, the first data byte that arrives at a node can be inspected by the node to comprise a value 'b' causing the node to switch from any existing behavior (A or B) to behavior B or to comprise a value 'a' causing the node to switch from any existing behavior (A or B) to behavior A.

In an embodiment of the invention, nodes may hold an information storage element holding the type of node. Types that can be distinguished are f.e. t0, for standard nodes, t1 for nodes that are the first node in their group and t2 for other nodes in a group. Every node may interrogate their neighbour downstream for its type and deduce it's behaviour from that. When having a downstream neighbour of type t0 or t1, the first byte of a packet is removed and the rest of the packet is transmitted towards this neighbour. When having a downstream neighbour of type t2, the first byte of a packet is not removed and the entire packet is transmitted towards this neighbour. The master needs to know the total configuration in order to put the channels at the correct places, which could be performed by transferring information from the tail of the chain towards the master.

In an embodiment of the invention, nodes may hold an information storage element holding the type of node. Types that can be distinguished are f.e. t0, for standard nodes, t1 for nodes that are the first node in their group and t2 for other nodes in a group. The master may then interrogate the first node after it's type. Next the master may put the first node in a transparent mode in which all master commands, except for an escape command, are forwarded transparently downstream and answers from downstream are forwarded transparently to the master. Then the master can interrogate the second node after it's type and put that one in transparent mode etcetera, until the master has reached the last node. Detection of a node being the last node could be done by asking that node if it has further downstream nodes attached, which the node may auto-detect after power-up. Alternatively, the master may send a message to a node that is downstream from the last node, but will never receive an answer. Using a time-out, the master will decide that the last node is indeed the last. Having detected a limit to the interrogation process, the master will then return all nodes to their operational state by sending an (escape) command. The master now knows all node types and may present this information via a user interface for subsequent configuration. The human or machine user may recognize the groups and decide on the amount of bytes to send and on what data is sent in these bytes.

In yet a further embodiment, a counter data is provided with the data supplied to a first node of a group. The node reduces a value of the counter data by a given amount, e.g. by one, and receives illumination data provided with the counter. This process is repeated for following nodes in the daisy chained network, until an end value (e.g. zero) of the counter is reached. Then, the node detecting the end value will assume the known modus wherein each node removes a first byte and uses this data byte as an illumination information for that node (previously referred to as behavior A). Thereby, nodes in a network may have a same behavior in terms of their way to handle incoming data, which offers additional flexibility as the presence of the counter data in the data stream provided to a node determines the behavior of that node.

The bus structure may be formed by any suitable bus structure. In an embodiment, use is made of a standard bus structure for this type of application, namely the DMX bus structure, whereby additional functionality as described in this document may be obtained without a necessity to change the standard of communication as perceived by the other nodes. The bus structure may be formed by any suitable network architecture. The data packet may have any suitable length (e.g. depending on the number of nodes or groups of nodes connected), any suitable form: separate data packets, a repetitive pattern of data packets, a data stream, etc.

In another embodiment, the data packet is modified by a node of the group by adding data or replacing data, the modified data packet being transmitted to the following node of the group. Thereby, within the group, any desired data can be transported via the bus structure towards following nodes in the group, without other nodes in the bus structure noticing and without requiring any changes or adaptation to such other nodes.

As an example of such modification, configuration data byte is added to the data packet to inform following nodes of the group that at least one data byte following the configuration data byte is to be interpreted in another way then standard. Any data may be transported in the group in such a way, such as additional illumination data, dimming information, a different color setting scheme (e.g. UV color coordinates in stead of RGB color information). Also, it is possible that data bytes are to be interpreted as having a different total length per node, e.g. are to be interpreted in such a way that two bytes per node together form a 16 bits data word per node, thereby instructing the following nodes of the group to interpret two successive data bytes as a 16 bit data word. The last node of the group may in this example remove the two bytes before retransmission.

As a further example of the modification of the data packet, a value of a data byte is changed by a node of the group into another value, before retransmission. Thereby, other factors, such as local circumstances of the node (e.g. an over-temperature signal, a user setting such as a local dimming setting signal, sensor data such as ambient illumination data from an ambient illumination sensor) may be taken into account for adaptation of the data transmitted via the data bus. As a result, all nodes within the group can react in a same way to stimuli, safety mechanisms, user settings, etc. while avoiding additional communication provisions between the nodes of the group.

The invention further comprises a communication node for a DMX communication network, the node comprising an input for receiving a data packet comprising data bytes and an output for retransmitting the data packet to a following node, wherein the data packet is retransmitted without removal of a first databyte of the incoming data packet.

Still, further, the invention comprises an illumination fixture or assembly comprising a LED illumination source, a driver (such as a pulse width modulation driver, pulse frequency modulation driver, multiplexer, or other controller to activate or deactivate one or more LEDs of the LED illumination source) for driving the LED illumination source, and a node according to the invention to control the driver.

The invention further comprises a bus structure comprising a plurality of nodes, each node comprising an input for receiving a data packet comprising data bytes and an output for retransmitting the data packet to a following node, wherein individual nodes are arranged for removing a first data byte from the data packet before retransmission, while a plurality of nodes forming a group, the nodes in the group, except the last one, exhibiting a different behavior than the individual nodes in that they are arranged for retransmitting the incoming data packet without removal of the first data byte from the data packet.

With the communication node, illumination assembly and bus structure according to the invention, the same or similar advantages may be achieved as with the method according to the invention. Also, the communication node, illumination assembly and bus structure according to the invention may be arranged for performing any of the embodiments of the invention as described with reference to the method according to the invention. The nodes may comprise a data processing unit (such as a microcontroller, microprocessor etc,) which is provided with suitable software instructions in order to perform the mentioned functions. Alternatively, or in addition thereto, the nodes may be provided with dedicated hardware, such as an electronic integrated circuit, e.g. an ASIC, etc, to perform the stated functionalty.

It will be understood by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

Although in the above reference has been made to a data byte, any suitable data size may be applied, such as a word, a triple byte, etc. Furthermore, although the above examples refer to daisy chaining, any suitable network architecture may be applied. The nodes may be formed by any suitable node. The illumination information contained in the data byte may comprise any suitable illumination information, such as intensity, color, pulsing or repetition parameters, or any other suitable information.

DRAWINGS

Further details, advantages and features of the invention will be explained with reference to the enclosed drawings and the below description illustrating non limiting embodiments of the present invention, the drawings, wherein.

Figure 1:
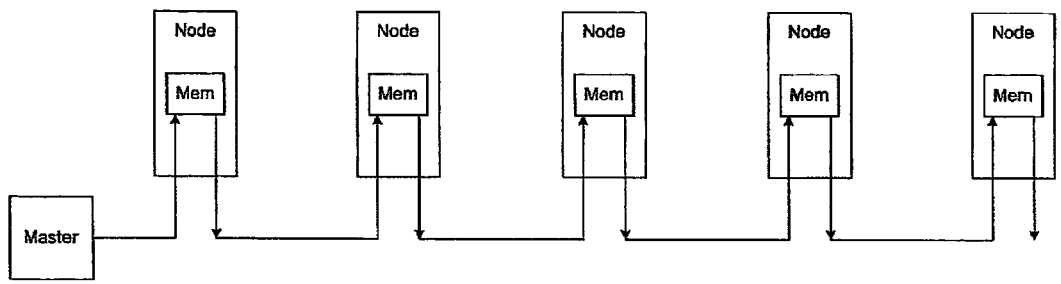
FIG. 1 depicts a bus topology of a true daisy chained bus.

FIG. 1 depicts a bus structure of daisy chained nodes of a LED illumination system. Each node is arranged to receive data at an incoming connection, and to transmit data at an outgoing connection. The incoming connection (input) of a node is connected to an outgoing connection of a previous node, while the outgoing connection (output) of a node is connected to an incoming connection of a following node, to thereby achieve a so called daisy chained bus structure. The connections may be provided by wired connections, optical (such as glass fiber) connections, or by wireless connections. Each node may be arranged to control one or more LEDs or one or more LED power supplies, each driving one or more LEDs. The bus structure may be provided with a master which sends data, commands, etc via the bus to each of the nodes. The bus structure may be formed by a so called DMX bus. The data is provided by a data packet comprising data bytes. Each node receives the data packet in its memory, removes a first data byte of the packet, uses the first data byte as data to be used by it for settings, control, etc, and retransmits the remainder of the data packet via the outgoing connection. Thus, in the daisy chained connection, each node removes a portion of a same size, and when the same data is to be transmitted to a group of two or more nodes, a repetition of the same data for each of the nodes of the group, would be required.

Figure 2:
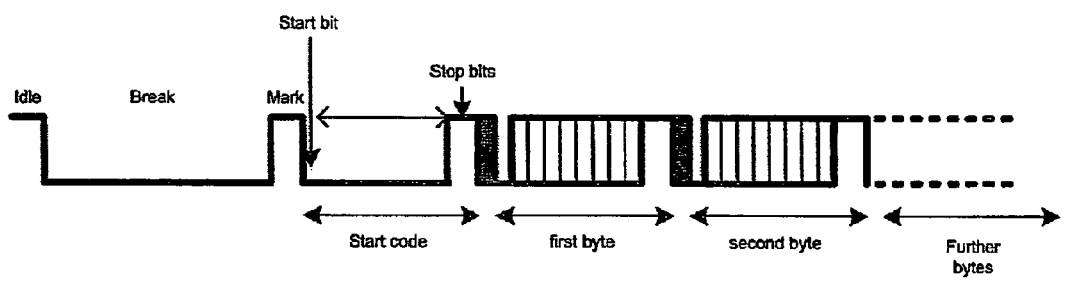
FIG. 2 depicts a DMX-like packet structure.
Figure 3:
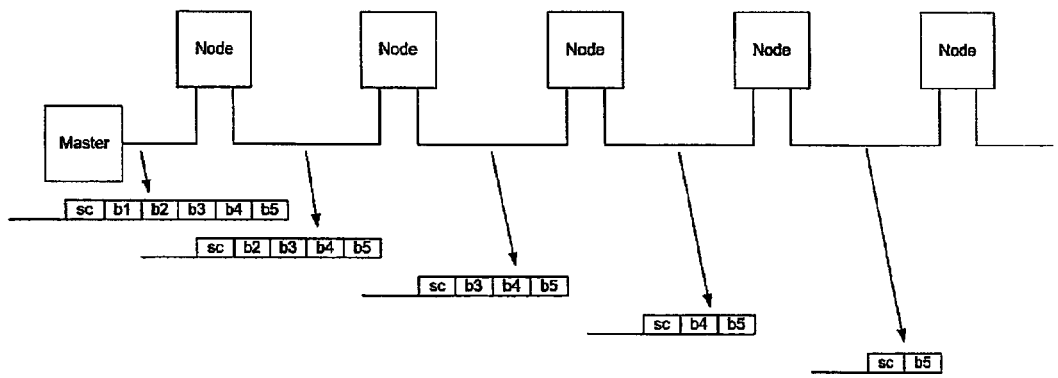
FIG. 3 depicts the principle of the removal of the first data byte per node, thus effectively arriving at an auto addressing system.

FIG. 2 depicts a data packet comprising a plurality of data bytes. Each data byte is preceded by start bits and at its end stop bits are provided. Start of the data packet is signaled by a start code. The start setup obtained thereby is illustrated with reference to FIG. 3. As depicted in FIG. 3, the master transmits via the bus a data chain comprising a start code SC, and 5 data bytes indicated as B1-B5. The first node which receives the data chain, uses the first of the bytes for its own settings, and, after removal of the first data byte B1, the chain is retransmitted. This process is repeated until the last node in the chain received a data packet comprising the start code SC and the last remaining data byte of the packet, namely B5. The master thereby addresses each of the nodes and sends it a corresponding data byte, by placing the data byte at the corresponding position in the chain.

Figure 4:
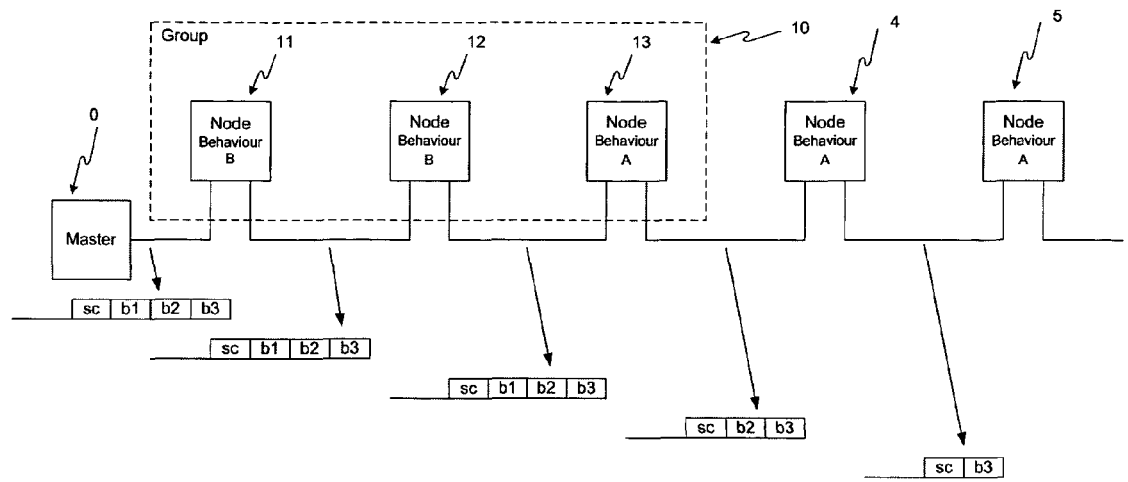
FIG. 4 depicts the principle, according to an aspect of the invention, of non-removal of the first-byte in all nodes belonging to a group but the last one, rendering these nodes to show behavior B.

FIG. 4 depicts a bus structure according to an aspect of the invention, wherein nodes 11, 12 and 13 having been grouped into a group 10, while nodes 4 and 5 remain individually addressable nodes. Thereto, the nodes of the group, except the last node 13, show a behavior in which they retransmit the data packet without removing the first data byte. Hence, the group of nodes is addressable from the master as a single node: the same data byte is received by the nodes of the group, without requiring the master to transmit that data byte to each of the nodes of the group individually.

Figure 5:
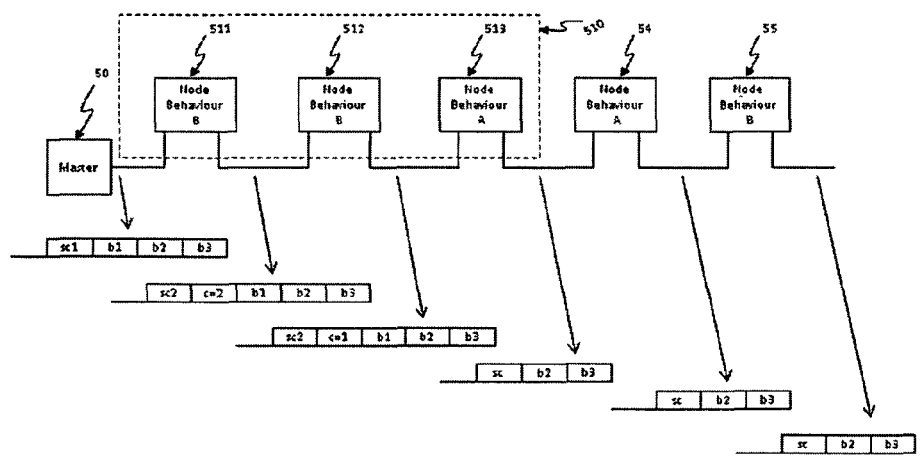
FIG. 5 depicts a principle of using a counter data, according to an aspect of the invention.

FIG. 5 depicts a bus structure according to an aspect of the invention, wherein nodes 511, 512 and 513 are grouped into a group 510, while nodes 54 and 55 are individually addressable. The master 50 of the bus structure thereby, likewise to the configuration depicted in FIG. 4, sends a data packet comprising a start code and 3 data bytes (one for the group, the other ones for nodes 54 and 55 respectively). The master transmits the data packet with in this example a special start code, referred to here as sc1, which indicates the first node that it is a first node in a group and of the group size. The first node 511 retransmits the data packet, whereby as a start byte the start code sc2 is used, which indicates that the byte which follows the first byte is a counter value. The counter value provides an information to the following nodes of the group about the remaining number of nodes in the group. Each following node 512, 513 of the group decreases the value of the counter by one and retransmits the data packet, until at the node 513 it is detected that the counter indicates that this node is the last node of the group. Node 513 now changes the start code from the code sc2 back to the normal start code sc, removes the counter byte and removes the first data byte, whereupon the data packet is retransmitted to the following nodes. By the counter data node behavior is determined: the node that receives a data packet with a start code that informs the node that a different behavior is requested, removes interprets the first data byte as a counter, decreases the counter value, uses the second data byte and retransmits without removal of a data byte, thereby showing the behavior indicated previously as behavior B. In this example, the first node is informed of the fact of being the first node in the group by the value of the start code, sc2. Alternatively, the first node of a group may be informed of this fact in many other ways, examples thereof having been described above (e.g. each node having a fixed behavior, the nodes being pre-programmed by the master to show a specific behavior, etc). In FIG. 5, the node 55 again behaves as a node in a group, which is seen in FIG. 5 from the fact that the node 55 retransmits the data packet without removal of a data byte.

Figure 6:
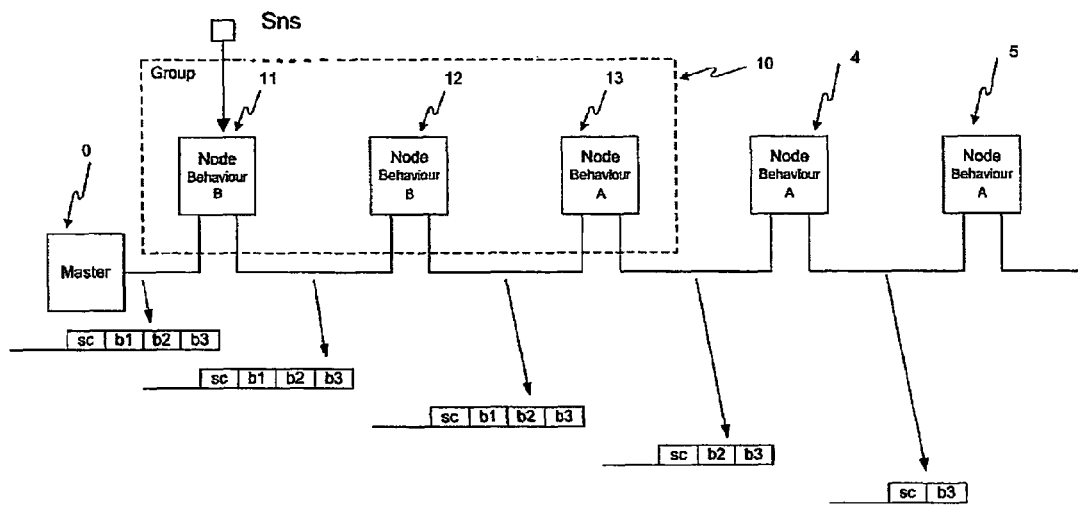
FIG. 6 depicts a variant to FIG. 4, for explaining a further embodiment of the invention.
Figure 7:
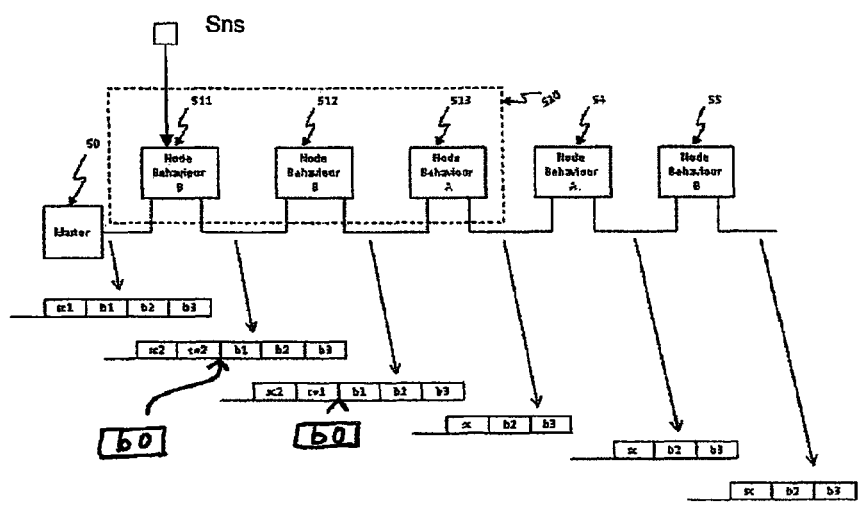
FIG. 7 depicts a variant to FIG. 5, for explaining a yet further embodiment of the invention.

FIGS. 6 and 7 depict configurations similar to that of FIGS. 4 and 5 respectively. Additionally, a sensor Sns is provided which is connected to the first node 11 and 511 respectively for proving a sensing data to the first node. The sensor Sns may for example comprise a temperature sensor to sense a safe operating temperature of one of more LED's connected to the node or of a power supply of the node or LED driver. As a further example, the sensor may comprise a light sensor such as an ambient light sensor, a light color sensor, etc. Instead of a sensor, the principle described here may be applied with any other input device, such as a dimmer or other user operated control unit, etc. The data from the sensor or other input means is received by the node 11 and 511 respectively. The node 11 or 511 may now, in response to the received data, add or modify the data packet as received by it. As an example, an additional data byte b0 may be added by node 511 (as shown in FIG. 7) and transmitted to the next node of the group. The last node of the group 513 may then remove both the additional data byte b0 and the first byte b1 before retransmission. As another example, data, such as data byte b1 of the data packet, may be modified by node 11. Thereby, information, commands, signals etc. as received from the sensor may be applied to change a setting for the nodes or LED's of the nodes belonging to the group. Thereby, the nodes of the group may react to the signal received from the sensor, input device or similar, making use of the data communication network, without the other nodes outside the group noticing any change in the data packet as provided to them.

The invention claimed is:

1. A data communication method for transmitting a data packet comprising data bytes in a daisy chained bus structure of a LED illumination system, the LED illumination system comprising at least one group of nodes, the at least one group comprising a plurality of nodes including a last node, the method comprising:
the plurality of nodes of the at least one group, except the last node of the group, retransmitting the data packet without removing any data bytes from the incoming data packet; and
the last node in the group removing the first byte of the data packet before retransmission, wherein each of the nodes in the group uses said first byte for its settings.

2. The data communication method according to claim 1, wherein the behavior to retransmit the data packet without removing a first byte from the incoming data packet is a fixed behavior of the node.

3. The data communication method according to claim 1, comprising commanding the nodes of the group to switch between the behavior to retransmit the data packet without removing the data byte from the incoming data packet and the behavior to remove the first byte from the data packet before retransmission.

4. The data communication method according to claim 3, wherein the commanding comprises setting a start code at a beginning of a data packet to a certain value to instruct the nodes to interpret the data in the packet as configuration data.

5. The data communication method according to claim 1, further comprising storing data representing a behavior of the or each node in an information storage element of the node.

6. The data communication method according to claim 5, wherein at least one node interrogates a neighboring downstream node thereof for its type and deduces its behavior therefrom.

7. The data communication method according to claim 5, comprising transferring information from a tail of the chain towards a master of the chain, so that the master is provided with information representing a configuration of the nodes of the chain.

8. The data communication method according to claim 5, further comprising:
the master of the chain interrogating the first node after its type, the master putting the first node in a transparent mode, the master interrogating successive further nodes after their type and successively putting them in transparent mode, the master sending an escape command to return all nodes to their operational state.

9. The data communication method according to claim 1, wherein a counter data is provided with the packet data, each node reducing a value of the counter data by a given amount and transmitting the data packet with the reduced counter value to a following node, until an end value of the counter is reached, the nodes that reduce the value of the counter data retransmitting the data packet without removing a first byte from the incoming data packet.

10. The data communication method according to claim 1, wherein the bus structure comprises a DMX bus structure.

11. The data communication method according to claim 1, wherein the data packet is modified by a node of the group by adding data or replacing data, the modified data packet being transmitted to the following node of the group.

12. The data communication method according to claim 11, wherein a configuration data byte is added to the data packet to inform following nodes of the group that at least one data byte following the configuration data byte is to be interpreted in another way then standard.

13. The data communication method according claim 11, wherein a value of a data byte is changed by a node of the group into another value, before retransmission.

14. A group of communication nodes for a DMX communication network, the nodes each comprising:
an input for receiving a data packet comprising data bytes, and an output for retransmitting the data packet to a following one of the nodes of the group,
wherein the nodes of the group, except the last node of the group are arranged for retransmitting the data packet without removal of any data bytes from of the incoming data packet, and the last node in the group removing the first byte of the data packet before retransmission, wherein each of the nodes in the group uses said first byte for its settings.

15. An illumination fixture comprising a LED illumination source, a driver for driving the LED illumination source, and a node according to claim 14 to control the driver.

16. A bus structure comprising:
a plurality of nodes forming a group, each node in the plurality of nodes comprising:
an input for receiving a data packet comprising data bytes, and
an output for retransmitting the data packet to a following node, and
individual nodes outside of the group are arranged for removing the first data byte of the data packet before retransmission,
wherein the nodes in the group, except the last one, exhibit a different behavior than the individual nodes in that they are arranged for retransmitting the incoming data packet without removal of any data bytes from the data packet and the last node in the group removes said first byte of the data packet before retransmission, wherein each of the nodes in the group uses said first byte for its settings.

* * * * *